(12) United States Patent
Son et al.

(10) Patent No.: US 12,061,316 B2
(45) Date of Patent: Aug. 13, 2024

(54) OPTICAL IMAGING SYSTEM

(71) Applicant: Samsung Electro-Mechanics Co., Ltd., Suwon-si (KR)

(72) Inventors: Ju Hwa Son, Suwon-si (KR); Jong Gi Lee, Suwon-si (KR); Sang Hyun Jang, Suwon-si (KR); Hyo Jin Hwang, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 381 days.

(21) Appl. No.: 17/010,046

(22) Filed: Sep. 2, 2020

(65) Prior Publication Data

US 2021/0157102 A1    May 27, 2021

(30) Foreign Application Priority Data

Nov. 21, 2019    (KR) .......................... 10-2019-0150652

(51) Int. Cl.
*G02B 13/00*    (2006.01)
*G02B 9/62*    (2006.01)

(52) U.S. Cl.
CPC ........... *G02B 13/0045* (2013.01); *G02B 9/62* (2013.01)

(58) Field of Classification Search
CPC ........ G02B 9/62; G02B 9/64; G02B 13/0045; G02B 13/06; G02B 13/18; G02B 27/0025; G02B 15/146; H04N 5/222; H04N 5/2254
USPC ......... 359/656–658, 708, 713, 749, 756–762
See application file for complete search history.

(56) References Cited

U.S. PATENT DOCUMENTS

| | | |
|---|---|---|
| 10,162,173 B2 | 12/2018 | Mori |
| 10,197,776 B2 | 2/2019 | Yin et al. |
| 10,564,394 B2 | 2/2020 | Sekine |
| 10,698,181 B2 | 6/2020 | Liao et al. |
| 2015/0212296 A1 | 7/2015 | Huang et al. |
| 2016/0252709 A1 | 9/2016 | Lin et al. |
| 2016/0259150 A1 | 9/2016 | Shin et al. |
| 2017/0017064 A1 | 1/2017 | Jo et al. |
| 2017/0059821 A1 | 3/2017 | Liu et al. |
| 2017/0059828 A1 | 3/2017 | Sekine et al. |
| 2017/0153419 A1 | 6/2017 | Hsieh et al. |
| 2017/0153448 A1* | 6/2017 | Mori .................. G02B 27/0025 |

(Continued)

FOREIGN PATENT DOCUMENTS

| | | |
|---|---|---|
| CN | 104808316 A | 7/2015 |
| CN | 105759406 A | 7/2016 |

(Continued)

OTHER PUBLICATIONS

Korean Office Action issued on Apr. 13, 2022, in the counterpart Korean Patent Application No. 10-2022-0018853 (12 pages in English and 7 pages in Korean).

(Continued)

*Primary Examiner* — Travis S Fissel
(74) *Attorney, Agent, or Firm* — NSIP Law

(57) ABSTRACT

An optical imaging system includes a first lens, a second lens, a third lens having negative refractive power, a fourth lens, a fifth lens, and a sixth lens, disposed in order from an object side. The optical imaging system has a field of view of 120 degrees or greater, and a distortion aberration at a highest height of an imaging plane is +30% or greater or −30% or lower.

17 Claims, 12 Drawing Sheets

(56) References Cited

U.S. PATENT DOCUMENTS

| | | | |
|---|---|---|---|
| 2017/0153449 A1 | 6/2017 | Mori | |
| 2017/0336604 A1 | 11/2017 | Hsu et al. | |
| 2018/0136443 A1* | 5/2018 | Yin | G02B 13/0045 |
| 2018/0348480 A1 | 12/2018 | Sekine | |
| 2019/0094497 A1 | 3/2019 | Huang | |
| 2019/0187427 A1* | 6/2019 | Sato | G02B 9/62 |
| 2019/0227278 A1 | 7/2019 | Chen et al. | |
| 2019/0243102 A1 | 8/2019 | Chen et al. | |
| 2019/0302418 A1* | 10/2019 | Liao | G02B 13/0045 |
| 2020/0183130 A1 | 6/2020 | Choi et al. | |

FOREIGN PATENT DOCUMENTS

| | | |
|---|---|---|
| CN | 105759407 A | 7/2016 |
| CN | 105938238 A | 9/2016 |
| CN | 106353874 A | 1/2017 |
| CN | 106842499 A | 6/2017 |
| CN | 107402431 A | 11/2017 |
| CN | 108008519 A | 5/2018 |
| CN | 108152924 A | 6/2018 |
| CN | 108459395 A | 8/2018 |
| CN | 109541778 A | 3/2019 |
| CN | 110068911 A | 7/2019 |
| CN | 110133830 A | 8/2019 |
| CN | 110187472 A | 8/2019 |
| CN | 110187483 A | 8/2019 |
| JP | 2000-275524 A | 10/2000 |
| JP | 2013-54295 A | 3/2013 |
| KR | 10-2020032 B1 | 9/2019 |

OTHER PUBLICATIONS

Chinese Office Action issued on Nov. 10, 2021, in counterpart Chinese Patent Application No. 202011277999.6 (9 pages in English and 11 pages in Chinese).

Korean Office Action issued on May 7, 2021 in counterpart Korean Patent Application No. 10-2019-0150652. (11 pages in English) (7 pages in Korean).

Korean Office Action issued on Mar. 28, 2023, in counterpart Korean Patent Application No. 10-2023-0006809 (5 pages in English, 4 pages in Korean).

Chinese Office Action issued on Mar. 15, 2024, in counterpart Chinese Patent Application No. 202210728947.9 (4 pages in English, 8 pages in Chinese).

* cited by examiner

OPTICAL IMAGING SYSTEM

CROSS-REFERENCE TO RELATED APPLICATION(S)

This application claims the benefit under 35 USC 119(a) of Korean Patent Application No. 10-2019-0150652 filed on Nov. 21, 2019 in the Korean Intellectual Property Office, the entire disclosure of which is incorporated herein by reference for all purposes.

BACKGROUND

1. Field

The following description relates to an optical imaging system having a field of view of 100 degrees or greater.

2. Description of Related Art

A small-sized camera may be mounted on a wireless terminal device. For example, a small-sized camera may be mounted on each of a front surface and a rear surface of a wireless terminal device. As such a small-sized camera may be used for various purposes, to obtain images of scenery, indoor portraits, and the like, such a small-sized camera has been required to have performance similar to that of a general camera. However, it may be difficult for a small-sized camera to implement high performance as there is a limitation in mounting space due to a limited size of a wireless terminal device. Thus, it has been required to develop an imaging lens system which may improve performance of a small-sized camera without increasing a size of a small-sized camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An optical imaging system having a wide field of view and a low f number.

In one general aspect, an optical imaging system includes a first lens, a second lens, a third lens having negative refractive power, a fourth lens, a fifth lens, and a sixth lens, disposed in order from an object side. The optical imaging system has a field of view of 120 degrees or greater, and a distortion aberration at a highest height of an imaging plane is +30% or greater or −30% or lower.

The optical imaging system may satisfy $0.1<DS1S3/2IMGHT<0.2$, where DS1S3 is a distance from an object-side surface of the first lens to an object-side surface of the second lens, and 2IMGHT is a diagonal length of the imaging plane.

The optical imaging system may satisfy $0.2<L1S1E/2IMGHT<2.0$, where L1S1E is an effective radius of an object-side surface of the first lens, and 2IMGHT is a diagonal length of the imaging plane.

An Abbe number of the third lens may be lower than 20.

The optical imaging system may satisfy $TTL/2IMGHT<0.9$, where TTL is a distance from an object-side surface of the first lens to the imaging plane, and 2IMGHT is a diagonal length of the imaging plane.

An f number of the optical imaging system may be 2.2 or lower.

The optical imaging system may satisfy $0.8<DL2/DL4<1.2$, where DL2 is a thickness of the second lens at a center of an optical axis, and DL4 is a thickness of the fourth lens at a center of an optical axis.

The second lens may have positive refractive power.

An effective radius of an object-side surface of the third lens may be greater than an effective radius of an object-side surface of the second lens.

In another general aspect, an optical imaging system includes a first lens having a concave object-side surface, a second lens, a third lens having negative refractive power and having a convex object-side surface, a fourth lens, a fifth lens, and a sixth lens, disposed in order from an object side. The optical imaging system has a field of view of 120 degrees or greater.

The second lens may have a convex object-side surface.

The fourth lens may have a concave object-side surface.

One of an object-side surface and an image-side surface of the fifth lens may be concave.

The sixth lens may have a concave image-side surface.

The second lens may have a convex image-side surface.

The third lens may have a concave image-side surface.

The first lens may have a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
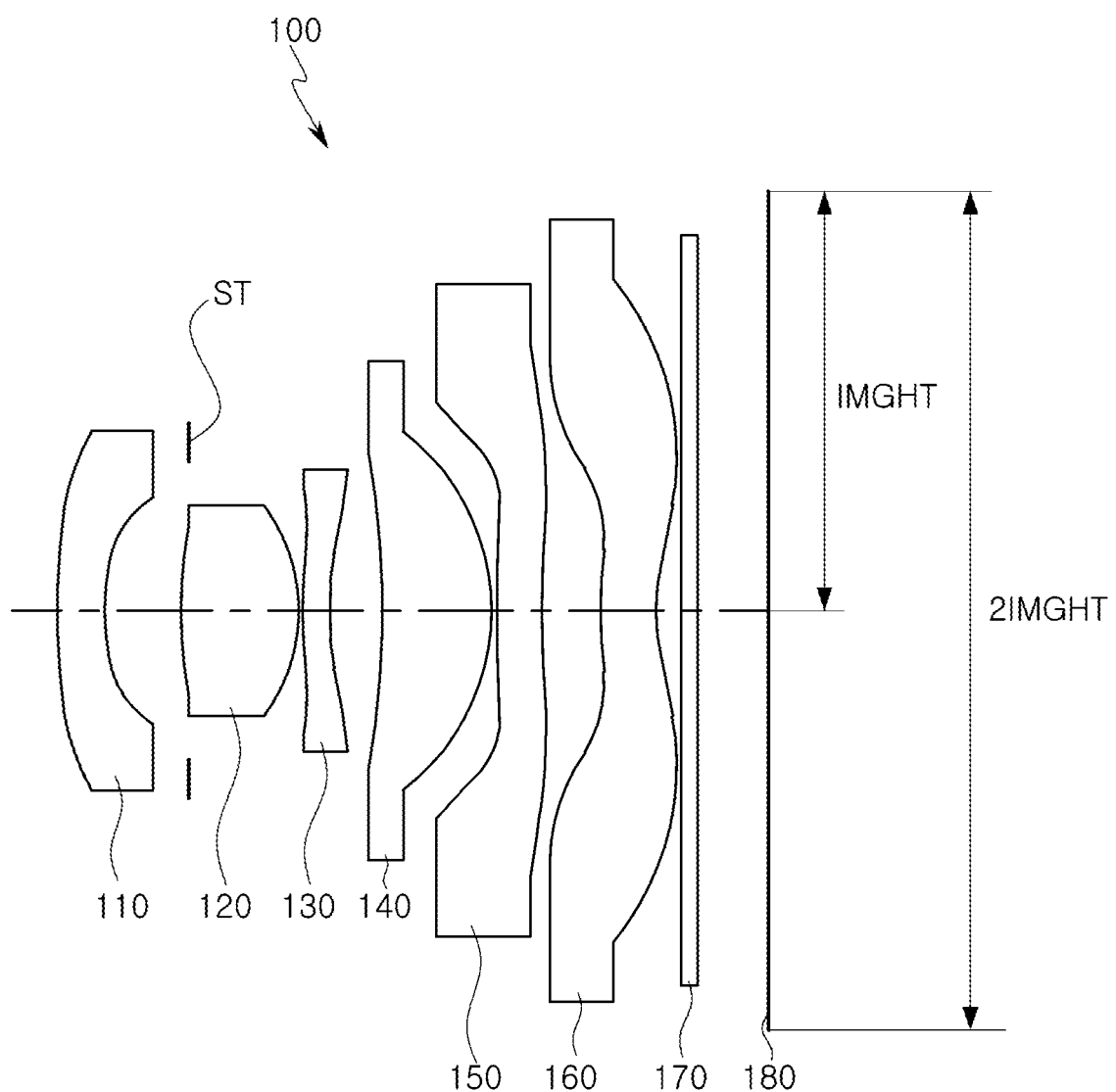
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the examples, a first lens refers to a lens most adjacent to an object (or a subject), and a sixth lens refers to a lens most adjacent to an imaging plane (or an image sensor). In the examples, a unit of a radius of curvature, a thickness, a TTL (a distance from an object-side surface of the first lens to an imaging plane), an 2IMGHT (a diagonal length of an imaging plane), and a focal length are indicated in millimeters (mm).

A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The optical imaging system may include six lenses. For example, the optical imaging system may include a first lens, a second lens, a third lens, a fourth lens, a fifth lens, and a sixth lens, disposed in order. The first to sixth lenses may be disposed with a predetermined gap therebetween. For example, a certain gap may be formed between an image-side surface of a front lens and an object-side surface of a rear lens.

The first lens may have refractive power. One surface of the first lens may be convex. For example, the first lens may have a concave object-side surface. The first lens may include an aspherical surface. For example, both surfaces of the first lens may be aspherical. The first lens may be formed of a material having high light transmissivity and excellent workability. For example, the first lens may be manufactured using a plastic material. However, a material of the first lens is not limited to a plastic material. For example, the first lens may be manufacturing using a glass material.

The first lens has a predetermined refractive index. For example, a refractive index of the first lens may lower than 1.6. The first lens may have a predetermined Abbe number. For example, an Abbe number of the first lens may be 50 or greater.

The second lens may have refractive power. For example, the second lens may have positive refractive power.

One surface of the second lens may be convex. For example, the second lens may have a convex object-side surface. The second lens may include an aspherical surface. For example, both surfaces of the second lens may be aspherical. The second lens may be formed of a material having high light transmissivity and excellent workability. For example, the second lens may be manufactured using a plastic material. However, a material of the second lens is not limited to a plastic material. For example, the second lens may be manufacturing using a glass material.

The second lens may have a refractive index similar to that of the first lens. For example, a refractive index of the second lens may lower than 1.6. The second lens may have a predetermined Abbe number. For example, an Abbe number of the second lens may be 50 or greater.

The third lens may have refractive power. For example, the third lens may have negative refractive power.

One surface of the third lens may be convex. For example, the third lens may have a convex object-side surface. The third lens may include an aspherical surface. For example, both surfaces of the third lens may be aspherical. The third lens may be formed of a material having high light transmissivity and excellent workability. For example, the third lens may be manufactured using a plastic material. However, a material of the third lens is not limited to a plastic material. For example, the third lens may be manufacturing using a glass material.

The third lens may have a refractive index greater than those of the other lenses. A refractive index of the third lens may be 1.65 or greater. The third lens may have an Abbe number lower than those of the other lenses. An Abbe number of the third lens may be lower than 20.

The fourth lens may have refractive power. One surface of the fourth lens may be convex. For example, the fourth lens may have a concave object-side surface. The fourth lens may include an aspherical surface. For example, both surfaces of the fourth lens may be aspherical. The fourth lens may be formed of a material having high light transmissivity and excellent workability. For example, the fourth lens may be manufactured using a plastic material. However, a material of the fourth lens is not limited to a plastic material. For example, the fourth lens may be manufacturing using a glass material.

The fourth lens may have a predetermined refractive index. For example, a refractive index of the fourth lens may be lower than 1.6. The fourth lens may have a predetermined Abbe number. For example, an Abbe number of the fourth lens may be 50 or greater.

The fifth lens may have refractive power. One surface of the fifth lens may be concave. For example, an object-side surface or an image-side surface of the fifth lens may be concave. However, a shape of the fifth lens is not limited to the above example. For example, both surfaces of the fifth lens may be convex. The fifth lens may include an aspherical surface. For example, both surfaces of the fifth lens may be aspherical. The fifth lens may have a shape having an inflection point. For example, an object-side surface or an image-side surface of the fifth lens may have an inflection point.

The fifth lens may be formed of a material having high light transmissivity and excellent workability. For example, the fifth lens may be manufactured using a plastic material. However, a material of the fifth lens is not limited to a plastic material. For example, the fifth lens may be manufacturing using a glass material.

The fifth lens may have a refractive index lower than that of the third lens. For example, the fifth lens may have a refractive index of lower than 1.65. The fifth lens may have an Abbe number greater than that of the third lens. For example, an Abbe number of the fifth lens may be 20 or greater.

The sixth lens may have refractive power. One surface of the sixth lens may be concave. For example, the sixth lens may have a concave image-side surface. The sixth lens may have a shape having an inflection point. For example, both surfaces of the sixth lens may have one or more inflection points. The sixth lens may include an aspherical surface. For example, both surfaces of the sixth lens may be aspherical.

The sixth lens may be formed of a material having high light transmissivity and excellent workability. For example, the sixth lens may be manufactured using a plastic material. However, a material of the sixth lens is not limited to a plastic material. For example, the sixth lens may be manufacturing using a glass material.

The sixth lens may have a refractive index lower than that of the third lens. For example, a refractive index of the sixth lens may be lower than 1.65. The sixth lens may have an Abbe number greater than that of the third lens. For example, an Abbe number of the sixth lens may be 20 or greater.

Each of the first to sixth lenses may have an aspherical shape. For example, at least one surface of the first to sixth lenses may be aspherical. An aspherical surface of each lens may be represented by Equation 1.

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Equation 1

In equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface to an apex of the aspherical surface in an optical axis direction.

The optical imaging system may further include a stop. The stop may be disposed between the first lens and the second lens.

The optical imaging system may further include a filter. The filter may block some wavelengths from incident light incident through the first to sixth lenses. For example, the filter may block an infrared wavelength of incident light.

The optical imaging system may further include an image sensor. The image sensor may provide an imaging plane on which light refracted by the lenses may be formed. For example, a surface of the image sensor may form an imaging plane. The image sensor may be configured to implement high resolution.

The optical imaging system may satisfy one or more of conditional expressions 1 to 8 as below:

| | |
|---|---|
| 120°<FOV | Conditional Expression 1: |
| 0.1<DS1S3/2IMGHT<0.2 | Conditional Expression 2: |
| 0.2<L1S1E/2IMGHT<2.0 | Conditional Expression 3: |
| V3<20 | Conditional Expression 4: |
| TTL/2IMGHT<0.9 | Conditional Expression 5: |
| F number<2.2 | Conditional Expression 6: |
| 0.8<DL2/DL4<1.2 | Conditional Expression 7: |
| L2S1E<L3S1E | Conditional Expression 8: |

In the above conditional expressions, FOV is a field of view of the optical imaging system, DS1S3 is a distance from an object-side surface of the first lens to an object-side surface of the second lens, 2IMGHT is a diagonal length of an imaging plane, L1S1E is an effective radius of an object-side surface of the first lens, V3 is an Abbe number of the third lens, TTL is a distance from an object-side surface of the first lens to an imaging plane, DL2 is a thickness of the second lens at a center of an optical axis, DL4 is a thickness of the fourth lens at a center of an optical axis, L2S1E is an effective radius of an object-side surface of the second lens, and L3S1E is an effective radius of an object-side surface of the third lens.

The optical imaging system may further satisfy one or more of conditional expressions 9 and 10 as below:

$2.0 < TTL/f < 3.0$     Conditional Expression 9:

$1.6 < SL/f < 2.2$     Conditional Expression 10:

In the conditional expressions, f is a focal length of the optical imaging system, and SL is a distance from the stop to an imaging plane.

The optical imaging system may have a distortion aberration of a considerable size at the highest height of an imaging plane. For example, the optical imaging system may have a distortion aberration of +30% or greater or a distortion aberration of −30% or lower at the highest height of an imaging plane.

The optical imaging system and the first to sixth lenses may have a predetermined focal length. For example, a focal length (f) of the optical imaging system may be within a range of 2.4 to 2.9 mm, a focal length (f1) of the first lens may be within a range of −10 to −3.5 mm, and a focal length (f2) of the second lens may be within a range of 2.0 to 2.5 mm, a focal length (f3) of the third lens may be within a range of −8.0 to −4.5 mm, a focal length (f4) of the fourth lens may be within a range of 2.0 to 4.0 mm, a focal length (f5) of the fifth lens may be within a range of lower than −20 mm or 8 mm or greater, and a focal length (f6) of the sixth lens may be within a range of −4.0 to −1.2 mm.

The first to sixth lenses have an effective area for refracting light. A diameter and radius of the effective area may vary for each lens. For example, an effective radius of an object-side surface of the third lens may be greater than an effective radius of an object-side surface of the second lens.

In the description below, various examples of an optical imaging system will be described.

A first example of the optical imaging system will be described with reference to FIG. 1.

The optical imaging system 100 may include a plurality of lenses each having refractive power. For example, the optical imaging system 100 may include a first lens 110, a second lens 120, a third lens 130, a fourth lens 140, a fifth lens 150, and a sixth lens 160.

The first lens 110 may have negative refractive power, and may have a concave object-side surface and a concave image-side surface. The second lens 120 may have positive refractive power, and may have a convex object-side surface and a convex image-side surface. The third lens 130 may have negative refractive power, and may have a convex object-side surface and a concave image-side surface. The fourth lens 140 may have positive refractive power, and may have a concave object-side surface and a convex image-side surface. The fifth lens 150 may have negative refractive power, and may have a convex object-side surface and a concave image-side surface. The fifth lens 150 may have a shape having an inflection point. For example, an inflection point may be formed on at least one of an object-side surface and an image-side surface of the fifth lens 150. The sixth lens 160 may have negative refractive power, and may have a convex object-side surface and a concave image-side surface. The sixth lens 160 may have a shape having an inflection point. For example, an inflection point may be formed on at least one of an object-side surface and an image-side surface of the sixth lens 160. One surface of the sixth lens 160 may have both a concave shape and a convex shape. For example, an object-side surface of the sixth lens may be convex at a paraxial region and may be concave around a paraxial region, and an image-side surface of the sixth lens may be concave at a paraxial region, and may be convex around a paraxial region.

The third lens 130 may have the largest refractive index of all the lenses. For example, the third lens 130 may have a refractive index of 1.65 or greater, and the other lenses may have a refractive index of lower than 1.65.

The third lens 130 may have the smallest Abbe number of all the lenses. For example, the third lens 130 may have an Abbe number of lower than 20, but the other lenses may have an Abbe number of 20 or greater.

The optical imaging system 100 may include a stop ST. For example, the stop ST may be disposed between the first lens 110 and the second lens 120. The stop ST may adjust the amount of light incident to an imaging plane 180.

The optical imaging system 100 may include a filter 170. For example, the filter 170 may be disposed between the sixth lens 160 and the imaging plane 180. The filter 170 may block light of a certain wavelength from entering. For example, the filter 170 of the example embodiment may block infrared rays from being incident to the imaging plane 180.

The optical imaging system 100 may include an image sensor. The image sensor provides the imaging plane 180 on which light refracted through the lenses is formed. The image sensor may convert an optical signal formed on the imaging plane 180 into an electrical signal.

Figure 2:
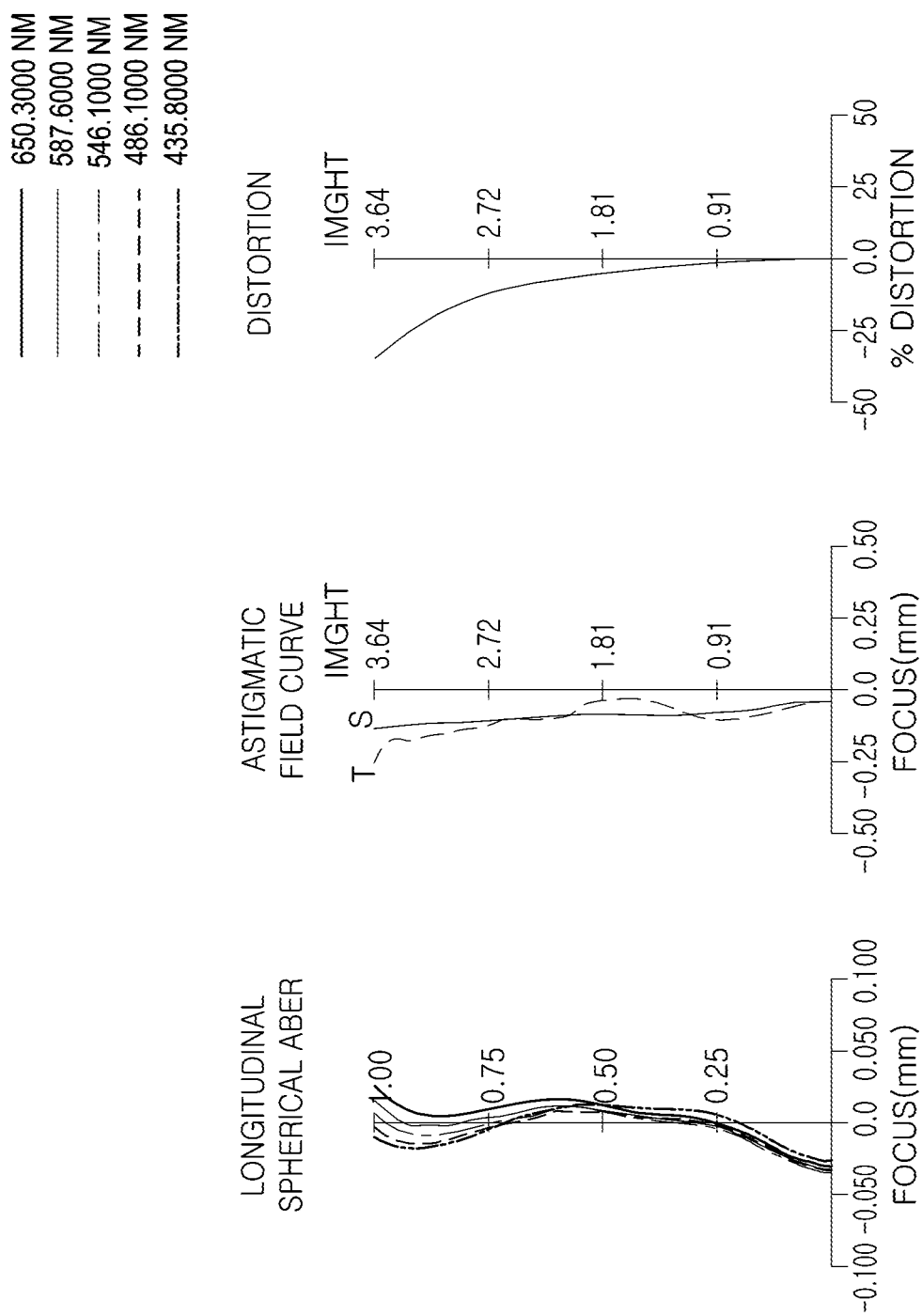
FIG. 2 is aberration curves of the optical imaging system illustrated in FIG. 1.

The optical imaging system 100 may exhibit aberration characteristics as illustrated in FIG. 2. Table 1 below shows lens characteristics of the optical imaging system 100, and Table 2 shows aspherical characteristics of the optical imaging system 100.

The optical imaging system 100 may have a distortion aberration of a considerable size at the highest height of the imaging plane. For example, the optical imaging system 100 may have a distortion aberration of approximately −40% at the highest height of the imaging plane.

TABLE 1

| Surface No. | Note | Radius of Curvature | Thickness/ Distance | Refractive Index | Abbe Number | Effective Radius | Focal Length |
|---|---|---|---|---|---|---|---|
| S1 | First | −8.8875 | 0.4058 | 1.5459 | 56.11 | 1.5310 | −4.6467 |
| S2 | Lens | 3.6126 | 0.6457 | | | 0.9703 | |
| S3 | Second | 3.7477 | 1.0307 | 1.5459 | 56.11 | 0.7200 | 2.1361 |
| S4 | Lens | −1.5308 | 0.0300 | | | 0.9105 | |

TABLE 1-continued

| Surface No. | Note | Radius of Curvature | Thickness/ Distance | Refractive Index | Abbe Number | Effective Radius | Focal Length |
|---|---|---|---|---|---|---|---|
| S5 | Third | 3.0558 | 0.2300 | 1.6795 | 19.25 | 1.0476 | −6.6550 |
| S6 | Lens | 1.7680 | 0.4652 | | | 1.2048 | |
| S7 | Fourth | −11.5612 | 0.9728 | 1.5459 | 56.11 | 1.3477 | 3.4169 |
| S8 | Lens | −1.6555 | 0.0300 | | | 1.5561 | |
| S9 | Fifth | 9.6839 | 0.3900 | 1.6461 | 23.53 | 1.7820 | −1003.7 |
| S10 | Lens | 9.3906 | 0.5173 | | | 2.2966 | |
| S11 | Sixth | 4.6765 | 0.4600 | 1.6461 | 23.53 | 2.5295 | −3.1383 |
| S12 | Lens | 1.3598 | 0.2275 | | | 2.8657 | |
| S13 | Filter | infinity | 0.1100 | 1.5183 | 64.17 | 3.1979 | |
| S14 | | infinity | 0.6260 | | | 3.2366 | |
| S15 | Imaging Plane | infinity | 0.0350 | | | 3.6280 | |

TABLE 2

| Surface No. | R | K | A | B | C | D | E | F | G | H | J |
|---|---|---|---|---|---|---|---|---|---|---|---|
| S1 | −8.8875 | 2.043 | 0.215 | −0.174 | 0.152 | −0.113 | 0.062 | −0.024 | 0.006 | −0.001 | 0.000 |
| S2 | 3.6126 | 11.760 | 0.191 | 1.144 | −7.589 | 27.924 | −63.726 | 92.239 | −82.149 | 40.989 | −8.804 |
| S3 | 3.7477 | −3.104 | −0.127 | 2.187 | −19.857 | 112.497 | −414.0 | 982.9 | −1451.0 | 1209.3 | −434.4 |
| S4 | −1.5308 | −1.784 | −0.130 | 1.088 | −5.678 | 17.437 | −35.316 | 46.950 | −39.413 | 18.937 | −3.976 |
| S5 | 3.0558 | −3.664 | −0.349 | 1.336 | −4.511 | 10.579 | −17.293 | 19.155 | −13.702 | 5.702 | −1.046 |
| S6 | 1.7680 | −1.634 | −0.335 | 0.730 | −1.408 | 1.988 | −2.016 | 1.444 | −0.709 | 0.219 | −0.032 |
| S7 | −11.5612 | 70.689 | 0.001 | 0.083 | −0.299 | 0.584 | −0.733 | 0.584 | −0.283 | 0.076 | −0.009 |
| S8 | −1.6555 | −0.586 | 0.119 | −0.376 | 0.750 | −0.960 | 0.780 | −0.402 | 0.126 | −0.022 | 0.002 |
| S9 | 9.6839 | −74.916 | 0.128 | −0.451 | 0.704 | −0.748 | 0.530 | −0.246 | 0.070 | −0.011 | 0.001 |
| S10 | 9.3906 | 12.571 | 0.081 | −0.237 | 0.227 | −0.125 | 0.043 | −0.010 | 0.001 | 0.000 | 0.000 |
| S11 | 4.6765 | −27.074 | −0.141 | −0.062 | 0.093 | −0.040 | 0.009 | −0.001 | 0.000 | 0.000 | 0.000 |
| S12 | 1.3598 | −0.821 | −0.296 | 0.139 | −0.051 | 0.014 | −0.003 | 0.000 | 0.000 | 0.000 | 0.000 |

Figure 3:
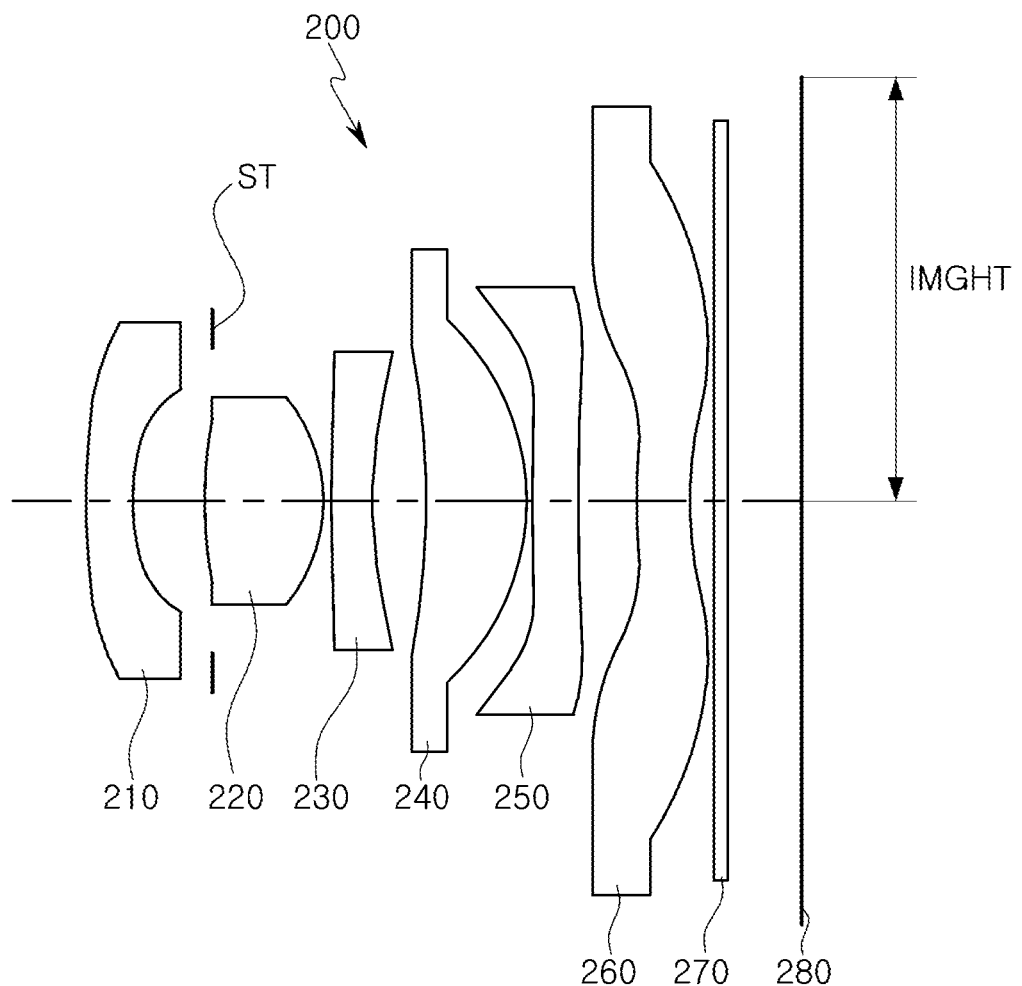
FIG. 3 is a diagram illustrating a second example of an optical imaging system.

A second example of the optical imaging system will be described with reference to FIG. 3.

The optical imaging system 200 may include a plurality of lenses each having refractive power. For example, the optical imaging system 200 may include a first lens 210, a second lens 220, a third lens 230, a fourth lens 240, a fifth lens 250, and a sixth lens 260.

The first lens 210 may have negative refractive power, and may have a concave object-side surface and a concave image-side surface. The second lens 220 may have positive refractive power, and may have a convex object-side surface and a convex image-side surface. The third lens 230 may have negative refractive power, and may have a convex object-side surface and a concave image-side surface. The fourth lens 240 may have positive refractive power, and may have a concave object-side surface and a convex image-side surface. The fifth lens 250 may have negative refractive power, and may have a convex object-side surface and a concave image-side surface. The fifth lens 250 may have a shape having an inflection point. For example, an inflection point may be formed on at least one of an object-side surface and an image-side surface of the fifth lens 250. The sixth lens 260 may have negative refractive power, and may have a convex object-side surface and a concave image-side surface. The sixth lens 260 may have a shape having an inflection point. For example, an inflection point may be formed on at least one of an object-side surface and an image-side surface of the sixth lens 260. One surface of the sixth lens 260 may have both a concave shape and a convex shape. For example, an object-side surface of the sixth lens may be convex at a paraxial region and may be concave around a paraxial region, and an image-side surface of the sixth lens may be concave at a paraxial region, and may be convex around a paraxial region.

The third lens 230 may have the largest refractive index of all the lenses. For example, the third lens 230 may have a refractive index of 1.65 or greater, and the other lenses may have a refractive index of lower than 1.65.

The third lens 230 may have the smallest Abbe number of all the lenses. For example, the third lens 230 may have an Abbe number of lower than 20, and the other lenses may have an Abbe number of 20 or greater.

The optical imaging system 200 may include a stop ST. For example, the stop ST may be disposed between the first lens 210 and the second lens 220. The stop ST may adjust the amount of light incident to an imaging plane 280.

The optical imaging system 200 may include a filter 270. For example, the filter 270 may be disposed between the sixth lens 260 and the imaging plane 280. The filter 270 may block light of a certain wavelength from entering. For example, the filter 270 of the example embodiment may block infrared rays from being incident to the imaging plane 280.

The optical imaging system 200 may include an image sensor. The image sensor may provide the imaging plane 280 on which light refracted through the lenses is formed. The image sensor may convert an optical signal formed on the imaging plane 280 into an electrical signal.

Figure 4:
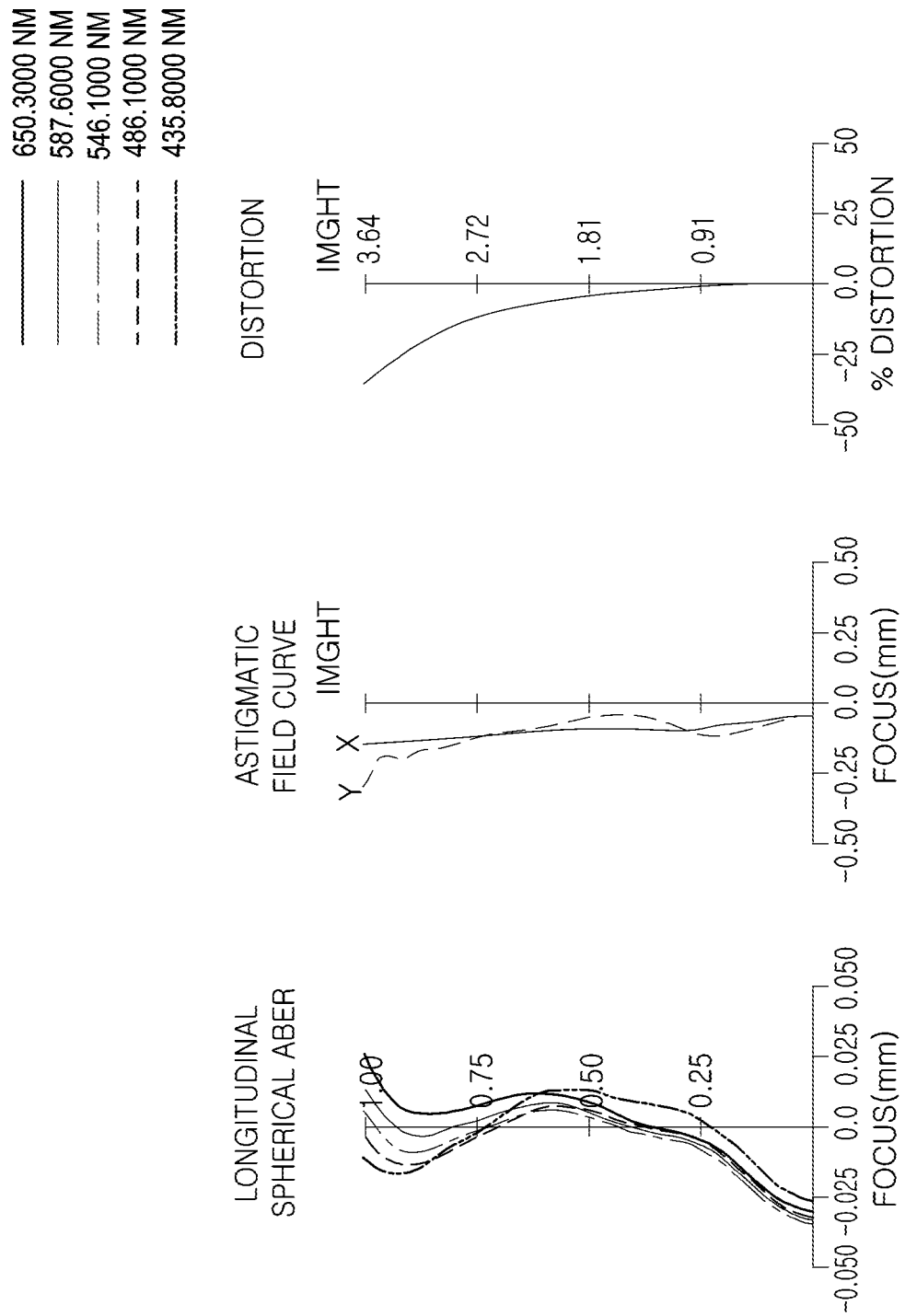
FIG. 4 is aberration curves of the optical imaging system illustrated in FIG. 3.

The optical imaging system 200 may exhibit aberration characteristics as illustrated in FIG. 4. Table 3 below shows lens characteristics of the optical imaging system 200, and Table 4 shows aspherical characteristics of the optical imaging system 200.

The optical imaging system 200 may have a distortion aberration of a considerable size at the highest height of the imaging plane. For example, the optical imaging system 200 may have a distortion aberration of approximately −40% at the highest height of the imaging plane.

TABLE 3

| Surface No. | Note | Radius of Curvature | Thickness/ Distance | Refractive Index | Abbe Number | Effective Radius | Focal Length |
|---|---|---|---|---|---|---|---|
| S1 | First | −10.3584 | 0.3632 | 1.5459 | 56.11 | 1.4793 | −4.6608 |
| S2 | Lens | 3.4195 | 0.6575 | | | 0.9590 | |
| S3 | Second | 4.1502 | 1.0377 | 1.5459 | 56.11 | 0.7100 | 2.1614 |
| S4 | Lens | −1.5052 | 0.0300 | | | 0.9105 | |
| S5 | Third | 4.2325 | 0.3500 | 1.6795 | 19.25 | 1.0522 | −6.7094 |
| S6 | Lens | 2.1214 | 0.4413 | | | 1.2516 | |
| S7 | Fourth | −12.2048 | 0.9204 | 1.5459 | 56.11 | 1.3825 | 3.2703 |
| S8 | Lens | −1.6005 | 0.0423 | | | 1.5546 | |
| S9 | Fifth | 14.5143 | 0.3900 | 1.6461 | 23.53 | 1.7783 | −80.8242 |
| S10 | Lens | 11.2378 | 0.4819 | | | 2.3173 | |
| S11 | Sixth | 4.1654 | 0.4600 | 1.6461 | 23.53 | 2.5750 | −3.1459 |
| S12 | Lens | 1.3068 | 0.2308 | | | 2.8842 | |
| S13 | Filter | infinity | 0.1100 | 1.5183 | 64.17 | 3.1908 | |
| S14 | | infinity | 0.6260 | | | 3.2291 | |
| S15 | Imaging Plane | infinity | 0.0340 | | | 3.6280 | |

TABLE 4

| Surface No. | R | K | A | B | C | D | E | F | G | H | J |
|---|---|---|---|---|---|---|---|---|---|---|---|
| S1 | −10.3584 | 11.815 | 0.242 | −0.203 | 0.181 | −0.136 | 0.076 | −0.031 | 0.008 | −0.001 | 0.000 |
| S2 | 3.4195 | 10.543 | 0.222 | 1.125 | −7.742 | 29.032 | −67.347 | 99.211 | −90.082 | 45.930 | −10.122 |
| S3 | 4.1502 | −7.801 | −0.134 | 2.268 | −21.016 | 121.494 | −457.3 | 1112.6 | −1685.1 | 1442.0 | −532.1 |
| S4 | −1.5052 | −1.392 | −0.180 | 1.181 | −5.663 | 16.973 | −34.192 | 45.484 | −38.272 | 18.441 | −3.886 |
| S5 | 4.2325 | 0.011 | −0.275 | 0.996 | −3.235 | 7.171 | −10.986 | 11.373 | −7.634 | 3.011 | −0.531 |
| S6 | 2.1214 | −0.918 | −0.210 | 0.307 | −0.394 | 0.306 | −0.092 | −0.048 | 0.046 | −0.009 | −0.001 |
| S7 | −12.2048 | 74.489 | 0.014 | 0.020 | −0.117 | 0.252 | −0.345 | 0.294 | −0.149 | 0.041 | −0.005 |
| S8 | −1.6005 | −0.917 | 0.178 | −0.508 | 0.913 | −1.101 | 0.868 | −0.442 | 0.139 | −0.024 | 0.002 |
| S9 | 14.5143 | 42.436 | 0.164 | −0.527 | 0.811 | −0.851 | 0.594 | −0.271 | 0.076 | −0.012 | 0.001 |
| S10 | 11.2378 | −4.159 | 0.065 | −0.186 | 0.179 | −0.098 | 0.033 | −0.007 | 0.001 | 0.000 | 0.000 |
| S11 | 4.1654 | −4.973 | −0.198 | −0.025 | 0.095 | −0.051 | 0.015 | −0.003 | 0.000 | 0.000 | 0.000 |
| S12 | 1.3068 | −0.808 | −0.330 | 0.172 | −0.071 | 0.022 | −0.005 | 0.001 | 0.000 | 0.000 | 0.000 |

Figure 5:
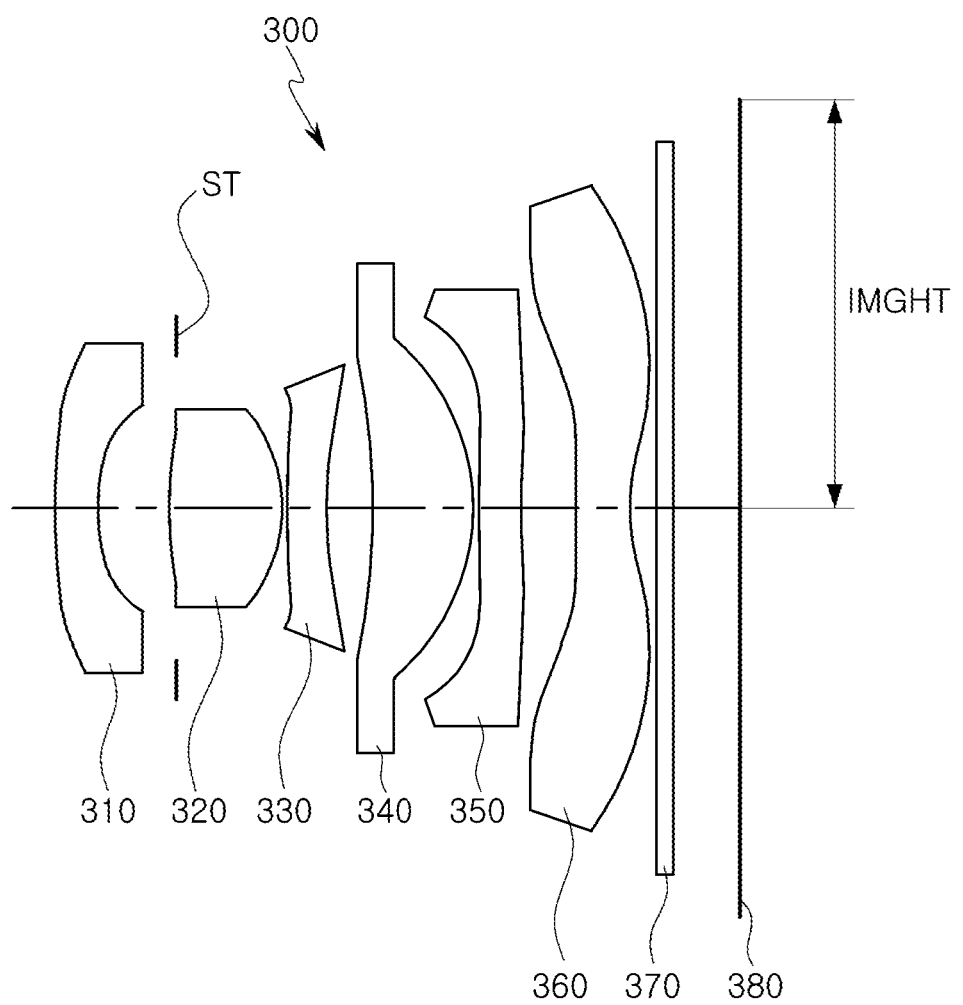
FIG. 5 is a diagram illustrating a third example of an optical imaging system.

A third example of the optical imaging system will be described with reference to FIG. 5.

The optical imaging system 300 may include a plurality of lenses each having refractive power. For example, the optical imaging system 300 may include a first lens 310, a second lens 320, a third lens 330, a fourth lens 340, a fifth lens 350, and a sixth lens 360.

The first lens 310 may have negative refractive power, and may have a concave object-side surface and a concave image-side surface. The second lens 320 may have positive refractive power, and may have a convex object-side surface and a convex image-side surface. The third lens 330 may have negative refractive power, and may have a convex object-side surface and a concave image-side surface. The fourth lens 340 may have positive refractive power, and may have a concave object-side surface and a convex image-side surface. The fifth lens 350 may have positive refractive power, and may have a convex object-side surface and a concave image-side surface. The fifth lens 350 may have a shape having an inflection point. For example, an inflection point may be formed on at least one of an object-side surface and an image-side surface of the fifth lens 350. The sixth lens 360 may have negative refractive power, and may have a convex object-side surface and a concave image-side surface. The sixth lens 360 may have a shape having an inflection point. For example, an inflection point may be formed on at least one of an object-side surface and an image-side surface of the sixth lens 360. One surface of the sixth lens 360 may have both a concave shape and a convex shape. For example, an object-side surface of the sixth lens may be convex at a paraxial region and may be concave around a paraxial region, and an image-side surface of the sixth lens may be concave at a paraxial region, and may be convex around a paraxial region.

The third lens 330 may have the largest refractive index of all the lenses. For example, the third lens 330 may have a refractive index of 1.65 or greater, but the other lenses may have a refractive index of lower than 1.65.

The third lens 330 of the first lens 310 to the sixth lens 360 may have the smallest Abbe number of all the lenses. For example, the third lens 330 may have an Abbe number of lower than 20, and the other lenses may have an Abbe number of 20 or greater.

The optical imaging system 300 may include a stop ST. For example, the stop ST may be disposed between the first lens 310 and the second lens 320. The stop ST may adjust the amount of light incident to an imaging plane 380.

The optical imaging system 300 may include a filter 370. For example, the filter 370 may be disposed between the sixth lens 360 and the imaging plane 380. The filter 370 may block light of a certain wavelength from entering. For example, the filter 370 of the example embodiment may block infrared rays from being incident to the imaging plane 380.

The optical imaging system 300 may include an image sensor. The image sensor may provide the imaging plane 380 on which light refracted through the lenses is formed. The image sensor may convert an optical signal formed on the imaging plane 380 into an electrical signal.

Figure 6:
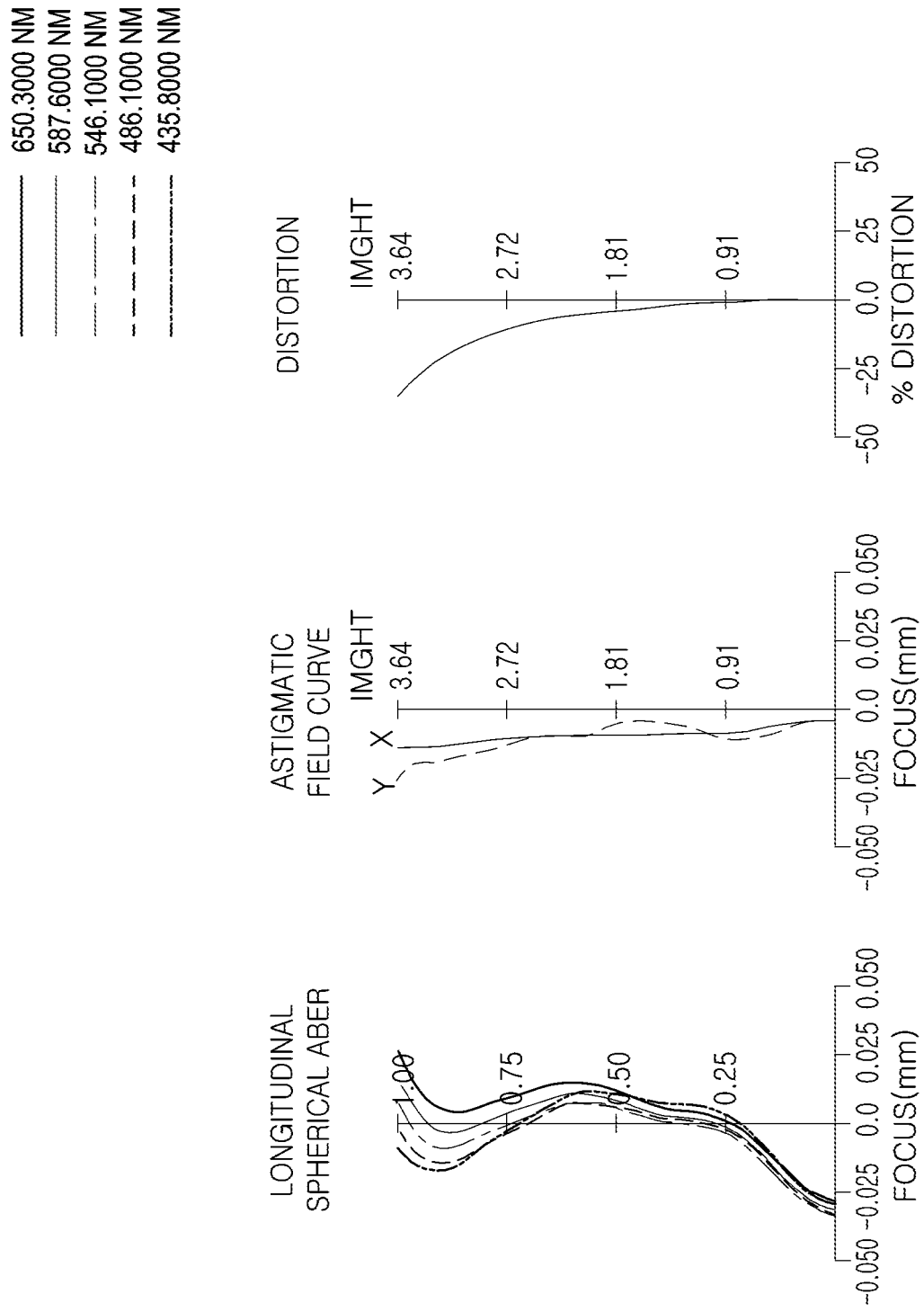
FIG. 6 is aberration curves of the optical imaging system illustrated in FIG. 5.

The optical imaging system 300 may exhibit aberration characteristics as illustrated in FIG. 6. Table 5 below shows lens characteristics of the optical imaging system 300, and Table 6 shows aspherical characteristics of the optical imaging system 300.

The optical imaging system 300 may have a distortion aberration of a considerable size at the highest height of the imaging plane. For example, the optical imaging system 300 may have a distortion aberration of approximately −40% at the highest height of the imaging plane.

image-side surface of the sixth lens 460. One surface of the sixth lens 460 may have both a concave shape and a convex shape. For example, an image-side surface of the sixth lens may be concave at a paraxial region and may be convex around a paraxial region.

TABLE 5

| Surface No. | Note | Radius of Curvature | Thickness/ Distance | Refractive Index | Abbe Number | Effective Radius | Focal Length |
|---|---|---|---|---|---|---|---|
| S1 | First | −10.8748 | 0.4020 | 1.5459 | 56.11 | 1.5000 | −4.7533 |
| S2 | Lens | 3.4575 | 0.6318 | | | 0.9522 | |
| S3 | Second | 4.1567 | 1.0197 | 1.5459 | 56.11 | 0.7100 | 2.1709 |
| S4 | Lens | −1.5164 | 0.0300 | | | 0.9105 | |
| S5 | Third | 4.3983 | 0.3500 | 1.6795 | 19.25 | 1.0519 | −6.7057 |
| S6 | Lens | 2.1659 | 0.4057 | | | 1.2540 | |
| S7 | Fourth | −11.5761 | 0.9608 | 1.5459 | 56.11 | 1.3486 | 3.4968 |
| S8 | Lens | −1.6883 | 0.0300 | | | 1.5424 | |
| S9 | Fifth | 9.0558 | 0.3900 | 1.6461 | 23.53 | 1.7665 | 67.5384 |
| S10 | Lens | 11.2342 | 0.4906 | | | 2.2973 | |
| S11 | Sixth | 4.2457 | 0.4600 | 1.6461 | 23.53 | 2.5412 | −3.1121 |
| S12 | Lens | 1.3065 | 0.2344 | | | 2.8678 | |
| S13 | Filter | infinity | 0.1100 | 1.5183 | 64.17 | 3.1950 | |
| S14 | | infinity | 0.6260 | | | 3.2336 | |
| S15 | Imaging Plane | infinity | 0.0340 | | | 3.6280 | |

TABLE 6

| Surface No. | R | K | A | B | C | D | E | F | G | H | J |
|---|---|---|---|---|---|---|---|---|---|---|---|
| S1 | −10.8748 | 13.631 | 0.215 | −0.171 | 0.153 | −0.117 | 0.067 | −0.027 | 0.007 | −0.001 | 0.000 |
| S2 | 3.4575 | 11.040 | 0.213 | 0.991 | −7.012 | 27.091 | −64.708 | 98.087 | −91.582 | 48.006 | −10.877 |
| S3 | 4.1567 | −6.002 | −0.151 | 2.603 | −24.468 | 142.720 | −538.5 | 1307.5 | −1971.2 | 1676.8 | −614.6 |
| S4 | −1.5164 | −1.475 | −0.165 | 1.159 | −5.950 | 18.813 | −39.594 | 54.631 | −47.411 | 23.447 | −5.045 |
| S5 | 4.3983 | 3.691 | −0.258 | 0.961 | −3.448 | 8.543 | −14.676 | 16.951 | −12.531 | 5.342 | −0.996 |
| S6 | 2.1659 | −0.848 | −0.207 | 0.333 | −0.562 | 0.781 | −0.887 | 0.773 | −0.467 | 0.168 | −0.027 |
| S7 | −11.5761 | 71.242 | 0.023 | −0.014 | −0.034 | 0.120 | −0.207 | 0.198 | −0.106 | 0.030 | −0.003 |
| S8 | −1.6883 | −0.739 | 0.126 | −0.478 | 0.984 | −1.266 | 1.031 | −0.533 | 0.168 | −0.029 | 0.002 |
| S9 | 9.0558 | −67.782 | 0.129 | −0.516 | 0.856 | −0.929 | 0.662 | −0.307 | 0.087 | −0.014 | 0.001 |
| S10 | 11.2342 | 14.567 | 0.067 | −0.220 | 0.224 | −0.126 | 0.044 | −0.010 | 0.001 | 0.000 | 0.000 |
| S11 | 4.2457 | −7.904 | −0.196 | −0.017 | 0.083 | −0.044 | 0.012 | −0.002 | 0.000 | 0.000 | 0.000 |
| S12 | 1.3065 | −0.807 | −0.328 | 0.173 | −0.072 | 0.022 | −0.005 | 0.001 | 0.000 | 0.000 | 0.000 |

Figure 7:
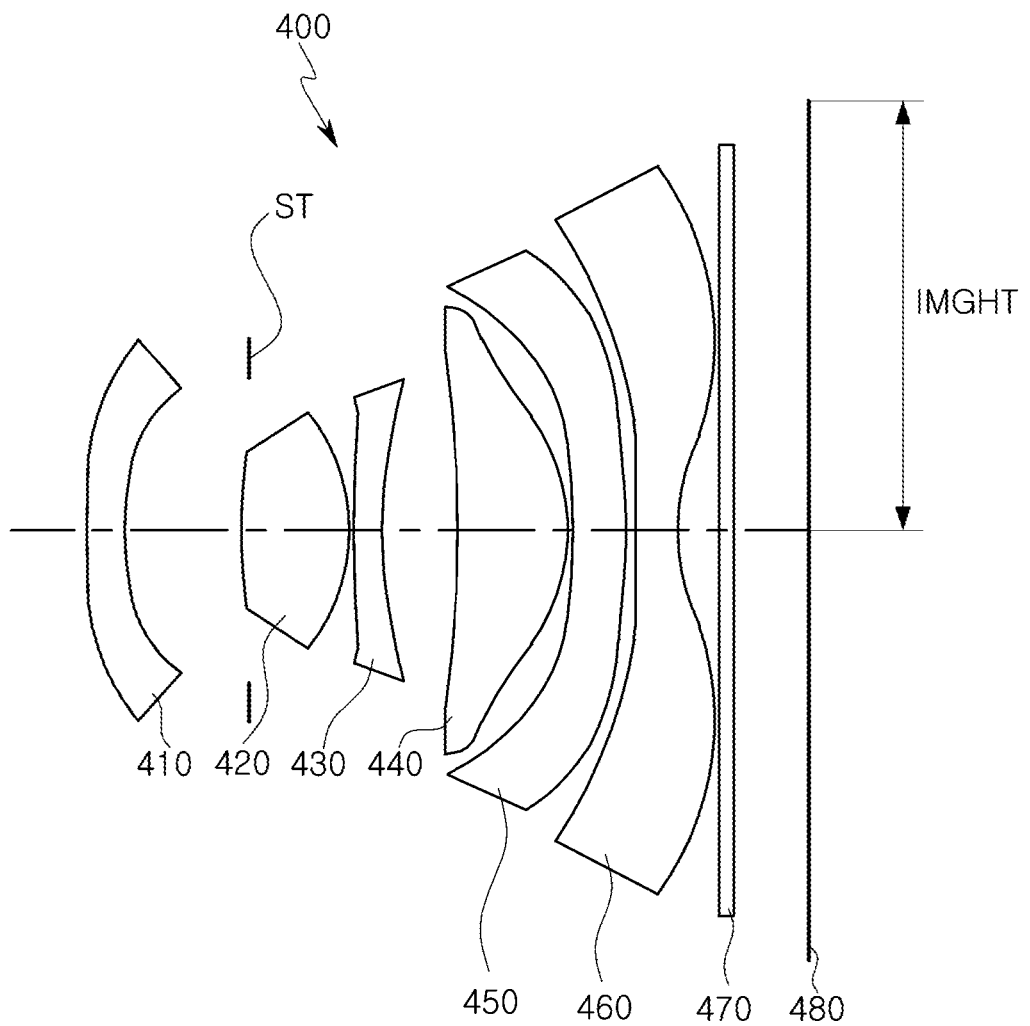
FIG. 7 is a diagram illustrating a fourth example of an optical imaging system.

A fourth example of the optical imaging system will be described with reference to FIG. 7.

The optical imaging system 400 may include a plurality of lenses each having refractive power. For example, the optical imaging system 400 may include a first lens 410, a second lens 420, a third lens 430, a fourth lens 440, a fifth lens 450, and a sixth lens 460.

The first lens 410 may have negative refractive power, and may have a concave object-side surface and a concave image-side surface. The second lens 420 may have positive refractive power, and may have a convex object-side surface and a convex image-side surface. The third lens 430 may have negative refractive power, and may have a convex object-side surface and a concave image-side surface. The fourth lens 440 may have positive refractive power, and may have a concave object-side surface and a convex image-side surface. The fifth lens 450 may have positive refractive power, and may have a concave object-side surface and a convex image-side surface. The fifth lens 450 may have a shape having an inflection point. For example, an inflection point may be formed on at least one of an object-side surface and an image-side surface of the fifth lens 450. The sixth lens 460 may have negative refractive power, and may have a concave object-side surface and a concave image-side surface. The sixth lens 460 may have a shape having an inflection point. For example, an inflection point may be formed on at least one of an object-side surface and an The third lens 430 may have the largest refractive index of all the lenses. For example, the third lens 430 may have a refractive index of 1.65 or greater, but the other lenses may have a refractive index of lower than 1.65.

The third lens 430 of the first lens 410 to the sixth lens 460 may have the smallest Abbe number of all the lenses. For example, the third lens 430 may have an Abbe number of lower than 20, and the other lenses may have an Abbe number of 20 or greater.

The optical imaging system 400 may include a stop ST. For example, the stop ST may be disposed between the first lens 410 and the second lens 420. The stop ST may adjust the amount of light incident to an imaging plane 480.

The optical imaging system 400 may include a filter 470. For example, the filter 470 may be disposed between the sixth lens 460 and the imaging plane 480. The filter 470 may block light of a certain wavelength from entering. For example, the filter 470 of the example embodiment may block infrared rays from being incident to the imaging plane 480.

The optical imaging system 400 may include an image sensor. The image sensor may provide the imaging plane 480 on which light refracted through the lenses is formed. The image sensor may convert an optical signal formed on the imaging plane 480 into an electrical signal.

Figure 8:
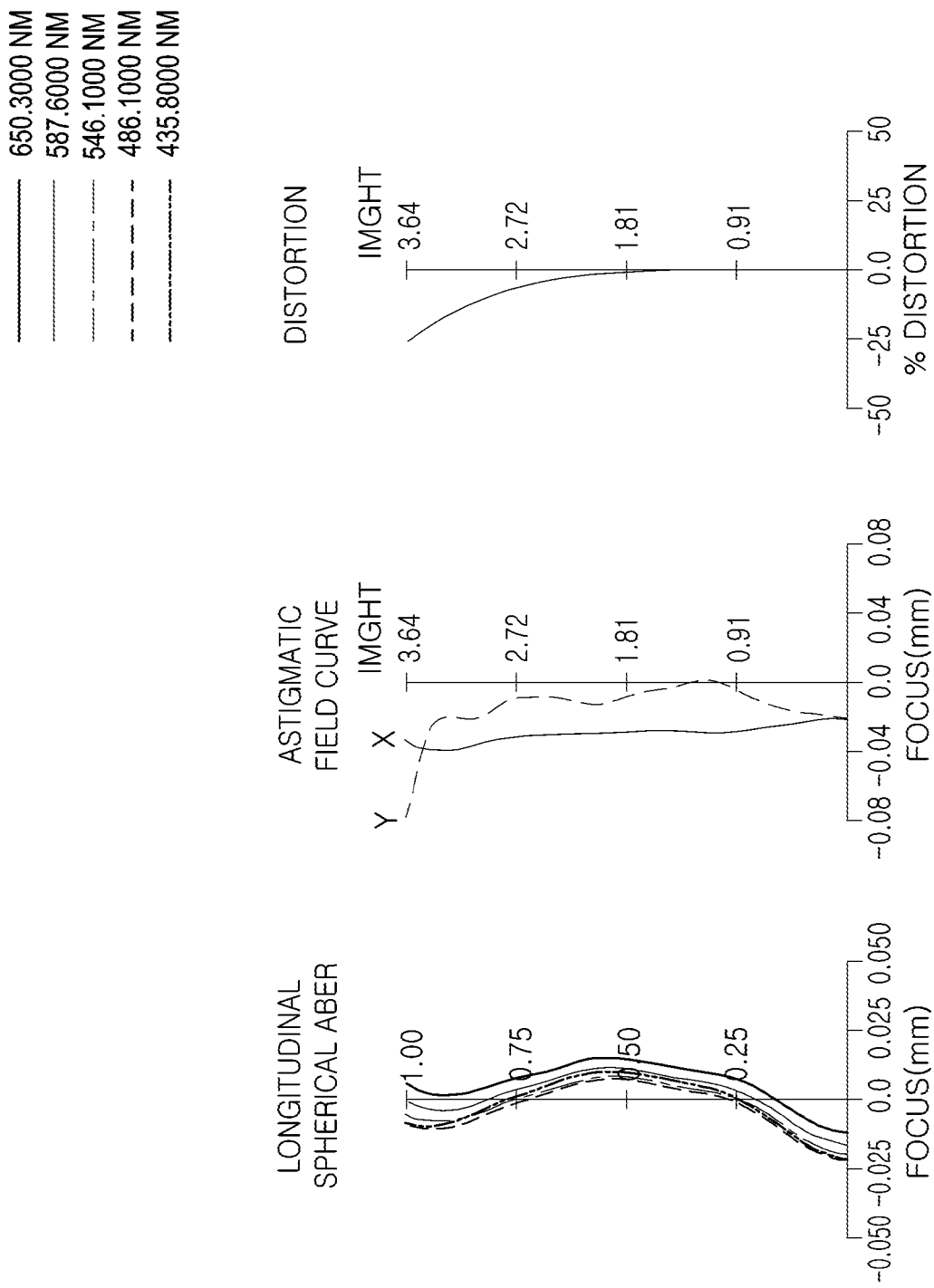
FIG. 8 is aberration curves of the optical imaging system illustrated in FIG. 7.

The optical imaging system 400 may exhibit aberration characteristics as illustrated in FIG. 8. Table 7 below shows lens characteristics of the optical imaging system 400, and Table 8 shows aspherical characteristics of the optical imaging system 400.

The optical imaging system 400 may have a distortion aberration of a considerable size at the highest height of the imaging plane. For example, the optical imaging system 400 may have a distortion aberration of approximately −35% at the highest height of the imaging plane.

TABLE 7

| Surface No. | Note | Radius of Curvature | Thickness/ Distance | Refractive Index | Abbe Number | Effective Radius | Focal Length |
|---|---|---|---|---|---|---|---|
| S1 | First | −10.2190 | 0.3023 | 1.5459 | 56.11 | 1.6009 | −9.3164 |
| S2 | Lens | 10.2529 | 0.9964 | | | 1.1917 | |
| S3 | Second | 4.7876 | 0.9230 | 1.5459 | 56.11 | 0.6500 | 2.3670 |
| S4 | Lens | −1.6517 | 0.0250 | | | 0.9683 | |
| S5 | Third | 3.6562 | 0.2354 | 1.6795 | 19.25 | 1.1196 | −6.9649 |
| S6 | Lens | 2.0090 | 0.6604 | | | 1.2588 | |
| S7 | Fourth | −10.9207 | 0.9368 | 1.5459 | 56.11 | 1.5296 | 2.3581 |
| S8 | Lens | −1.1876 | 0.0250 | | | 1.7160 | |
| S9 | Fifth | −14.3579 | 0.3700 | 1.6461 | 23.53 | 1.8320 | 35.8584 |
| S10 | Lens | −8.9541 | 0.1651 | | | 2.2345 | |
| S11 | Sixth | −28.2390 | 0.3700 | 1.5459 | 56.11 | 2.4000 | −1.9851 |
| S12 | Lens | 1.1334 | 0.3582 | | | 2.8895 | |
| S13 | Filter | infinity | 0.1100 | 1.5183 | 64.17 | 3.1810 | |
| S14 | | infinity | 0.6303 | | | 3.2215 | |
| S15 | Imaging Plane | infinity | 0.0197 | | | 3.6281 | |

TABLE 8

| Surface No. | R | K | A | B | C | D | E | F | G | H | J |
|---|---|---|---|---|---|---|---|---|---|---|---|
| S1 | −10.2190 | −7.639 | 0.197 | −0.138 | 0.125 | −0.092 | 0.046 | −0.013 | 0.001 | 0.000 | 0.000 |
| S2 | 10.2529 | −58.492 | 0.269 | −0.167 | 0.293 | −0.457 | 0.665 | −0.746 | 0.579 | −0.263 | 0.049 |
| S3 | 4.7876 | −20.272 | −0.058 | 1.217 | −16.992 | 132.848 | −639.5 | 1913.8 | −3469.6 | 3485.7 | −1488.5 |
| S4 | −1.6517 | −1.450 | −0.114 | 0.524 | −2.236 | 5.259 | −7.861 | 7.318 | −4.076 | 1.223 | −0.161 |
| S5 | 3.6562 | 3.113 | −0.262 | 0.752 | −2.274 | 4.781 | −6.878 | 6.595 | −4.024 | 1.413 | −0.218 |
| S6 | 2.0090 | −0.733 | −0.224 | 0.370 | −0.583 | 0.657 | −0.478 | 0.195 | −0.024 | −0.010 | 0.003 |
| S7 | −10.9207 | 47.379 | 0.001 | −0.020 | 0.093 | −0.156 | 0.147 | −0.081 | 0.027 | −0.005 | 0.000 |
| S8 | −1.1876 | −0.977 | 0.023 | 0.278 | −0.621 | 0.728 | −0.534 | 0.251 | −0.073 | 0.012 | −0.001 |
| S9 | −14.3579 | −28.748 | −0.077 | 0.295 | −0.481 | 0.389 | −0.192 | 0.060 | −0.011 | 0.001 | 0.000 |
| S10 | −8.9541 | 12.111 | 0.267 | −0.267 | 0.115 | −0.018 | −0.005 | 0.003 | −0.001 | 0.000 | 0.000 |
| S11 | −28.2390 | 90.226 | 0.281 | −0.529 | 0.413 | −0.189 | 0.055 | −0.010 | 0.001 | 0.000 | 0.000 |
| S12 | 1.1334 | −1.080 | −0.249 | 0.089 | −0.020 | 0.002 | 0.000 | 0.000 | 0.000 | 0.000 | 0.000 |

Figure 9:
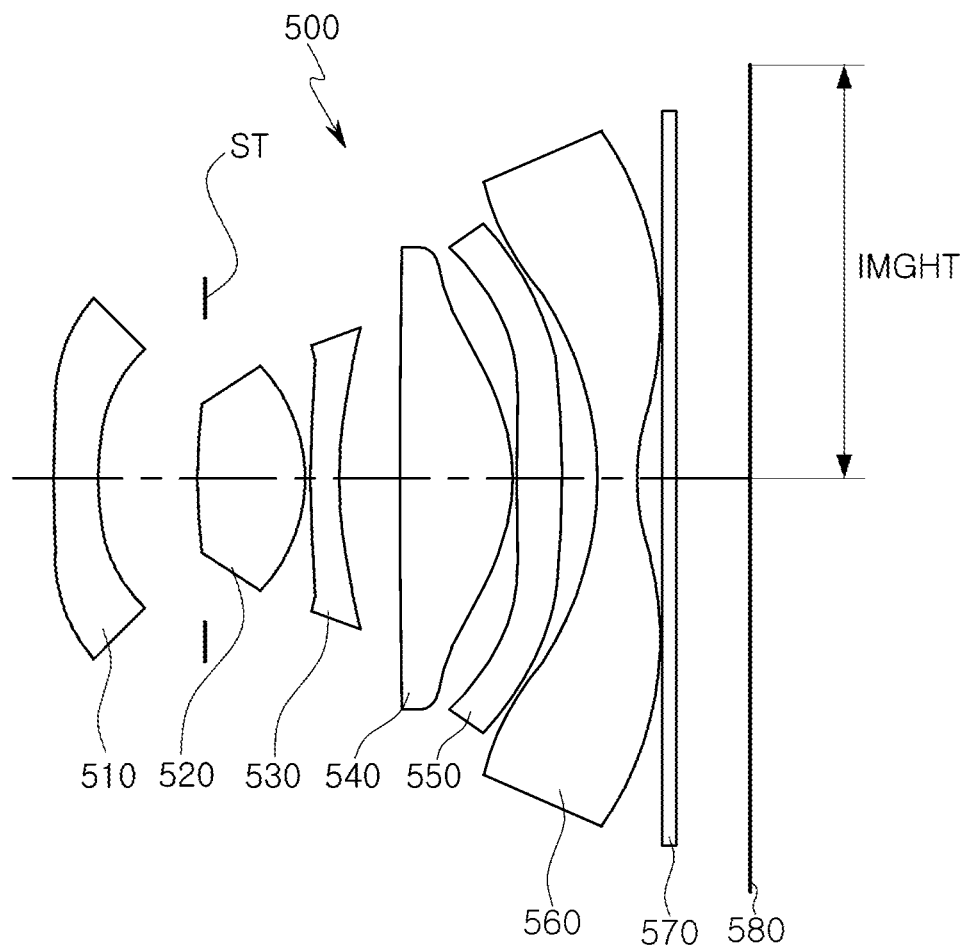
FIG. 9 is a diagram illustrating a fifth example of an optical imaging system.

A fifth example of the optical imaging system will be described with reference to FIG. 9.

The optical imaging system 500 may include a plurality of lenses each having refractive power. For example, the optical imaging system 500 may include a first lens 510, a second lens 520, a third lens 530, a fourth lens 540, a fifth lens 550, and a sixth lens 560.

The first lens 510 may have negative refractive power, and may have a concave object-side surface and a concave image-side surface. The second lens 520 may have positive refractive power, and may have a convex object-side surface and a convex image-side surface. The third lens 530 may have negative refractive power, and may have a convex object-side surface and a concave image-side surface. The fourth lens 540 may have positive refractive power, and may have a concave object-side surface and a convex image-side surface. The fifth lens 550 may have positive refractive power, and may have a convex object-side surface and a convex image-side surface. The fifth lens 550 may have a shape having an inflection point. For example, an inflection point may be formed on at least one of an object-side surface and an image-side surface of the fifth lens 550. The sixth lens 560 may have negative refractive power, and may have a concave object-side surface and a concave image-side surface. The sixth lens 560 may have a shape having an inflection point. For example, an inflection point may be formed on at least one of an object-side surface and an image-side surface of the sixth lens 560. One surface of the sixth lens 560 may have both a concave shape and a convex shape. For example, an object-side surface of the sixth lens may be concave at a paraxial region and may be convex around a paraxial region, and an image-side surface of the sixth lens may be concave at a paraxial region and may be convex around a paraxial region.

The third lens 530 may have the largest refractive index of all the lenses. For example, the third lens 530 may have a refractive index of 1.65 or greater, but the other lenses may have a refractive index of lower than 1.65.

The third lens 530 may have the smallest Abbe number of all the lenses. For example, the third lens 530 may have an Abbe number of lower than 20, and the other lenses may have an Abbe number of 20 or greater.

The optical imaging system 500 may include a stop ST. For example, the stop ST may be disposed between the first lens 510 and the second lens 520. The stop ST may adjust the amount of light incident to an imaging plane 580.

The optical imaging system 500 may include a filter 570. For example, the filter 570 may be disposed between the sixth lens 560 and the imaging plane 580. The filter 570 may block light of a certain wavelength from entering. For example, the filter 570 of the example embodiment may block infrared rays from being incident to the imaging plane 580.

The optical imaging system 500 may include an image sensor. The image sensor may provide the imaging plane 580 on which light refracted through the lenses is formed. The image sensor may convert an optical signal formed on the imaging plane 580 into an electrical signal.

Figure 10:
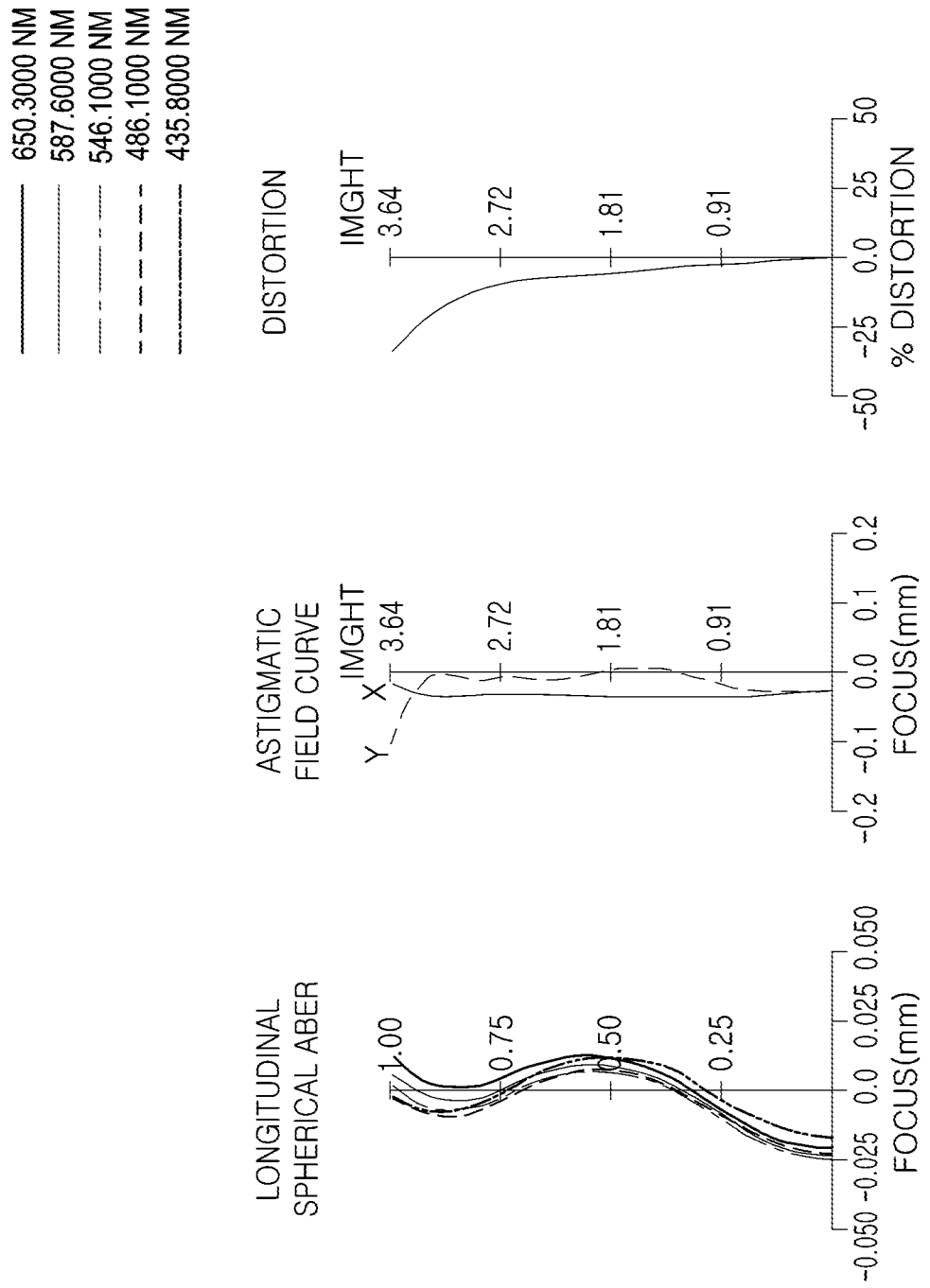
FIG. 10 is aberration curves of the optical imaging system illustrated in FIG. 9.

The optical imaging system 500 may exhibit aberration characteristics as illustrated in FIG. 10. Table 9 below shows lens characteristics of the optical imaging system 500, and Table 10 shows aspherical characteristics of the optical imaging system 500.

The optical imaging system 500 may have a distortion aberration of a considerable size at the highest height of the imaging plane. For example, the optical imaging system 500 may have a distortion aberration of approximately −35% at the highest height of the imaging plane.

concave image-side surface. The fifth lens 650 may have a shape having an inflection point. For example, an inflection point may be formed on at least one of an object-side surface and an image-side surface of the fifth lens 650. The sixth lens 660 may have negative refractive power, and may have a convex object-side surface and a concave image-side surface. The sixth lens 660 may have a shape having an inflection point. For example, an inflection point may be formed on at least one of an object-side surface and an image-side surface of the sixth lens 660. One surface of the sixth lens 660 may have both a concave shape and a convex shape. For example, an object-side surface of the sixth lens may be convex at a paraxial region and may be concave

TABLE 9

| Surface No. | Note | Radius of Curvature | Thickness/ Distance | Refractive Index | Abbe Number | Effective Radius | Focal Length |
|---|---|---|---|---|---|---|---|
| S1 | First | −5.3138 | 0.3807 | 1.5459 | 56.11 | 1.6200 | −7.7864 |
| S2 | Lens | 21.9015 | 0.9067 | | | 1.1470 | |
| S3 | Second | 5.4013 | 0.9575 | 1.5459 | 56.11 | 0.6500 | 2.3471 |
| S4 | Lens | −1.5768 | 0.0200 | | | 0.9918 | |
| S5 | Third | 3.4999 | 0.2300 | 1.6795 | 19.25 | 1.1468 | −6.8107 |
| S6 | Lens | 1.9398 | 0.6000 | | | 1.3222 | |
| S7 | Fourth | −17.9929 | 1.0011 | 1.5459 | 56.11 | 1.7145 | 2.8918 |
| S8 | Lens | −1.4813 | 0.0200 | | | 1.9006 | |
| S9 | Fifth | 23.3757 | 0.3995 | 1.6461 | 23.53 | 2.0300 | 8.2036 |
| S10 | Lens | −6.8086 | 0.3214 | | | 2.1949 | |
| S11 | Sixth | −4.6119 | 0.3600 | 1.6461 | 23.53 | 2.3000 | −1.7794 |
| S12 | Lens | 1.5783 | 0.2332 | | | 2.8683 | |
| S13 | Filter | infinity | 0.1100 | 1.5183 | 64.17 | 3.1722 | |
| S14 | | infinity | 0.6250 | | | 3.2133 | |
| S15 | Imaging Plane | infinity | 0.0250 | | | 3.6280 | |

TABLE 10

| Surface No. | R | K | A | B | C | D | E | F | G | H | J |
|---|---|---|---|---|---|---|---|---|---|---|---|
| S1 | −5.3138 | −8.177 | 0.184 | −0.097 | 0.035 | 0.017 | −0.034 | 0.023 | −0.008 | 0.001 | 0.000 |
| S2 | 21.9015 | −99.000 | 0.247 | 0.009 | −0.272 | 0.565 | −0.314 | −0.456 | 0.894 | −0.573 | 0.129 |
| S3 | 5.4013 | −18.227 | −0.023 | −0.093 | 2.718 | −28.731 | 154.1 | −483.0 | 887.5 | −885.9 | 369.7 |
| S4 | −1.5768 | −1.885 | 0.001 | −0.095 | −0.467 | 1.886 | −2.784 | 0.887 | 1.888 | −2.038 | 0.598 |
| S5 | 3.4999 | 2.507 | −0.178 | 0.308 | −1.010 | 2.298 | −3.163 | 2.464 | −0.982 | 0.135 | 0.011 |
| S6 | 1.9398 | −0.856 | −0.249 | 0.485 | −1.091 | 1.904 | −2.247 | 1.696 | −0.781 | 0.199 | −0.022 |
| S7 | −17.9929 | 92.137 | −0.005 | 0.046 | −0.052 | 0.021 | 0.008 | −0.011 | 0.005 | −0.001 | 0.000 |
| S8 | −1.4813 | −0.964 | 0.032 | 0.152 | −0.318 | 0.331 | −0.212 | 0.086 | −0.021 | 0.003 | 0.000 |
| S9 | 23.3757 | 35.597 | 0.011 | 0.125 | −0.286 | 0.262 | −0.143 | 0.048 | −0.010 | 0.001 | 0.000 |
| S10 | −6.8086 | 7.251 | 0.161 | −0.125 | −0.015 | 0.057 | −0.033 | 0.010 | −0.002 | 0.000 | 0.000 |
| S11 | −4.6119 | −8.664 | 0.078 | −0.241 | 0.163 | −0.049 | 0.006 | 0.000 | 0.000 | 0.000 | 0.000 |
| S12 | 1.5783 | −1.015 | −0.197 | 0.064 | −0.008 | −0.002 | 0.001 | 0.000 | 0.000 | 0.000 | 0.000 |

A sixth example of the optical imaging system will be described with reference to FIG. 11.

The optical imaging system 600 may include a plurality of lenses each having refractive power. For example, the optical imaging system 600 may include a first lens 610, a second lens 620, a third lens 630, a fourth lens 640, a fifth lens 650, and a sixth lens 660.

The first lens 610 may have negative refractive power, and may have a concave object-side surface and a concave image-side surface. The second lens 620 may have positive refractive power, and may have a convex object-side surface and a convex image-side surface. The third lens 630 may have negative refractive power, and may have a convex object-side surface and a concave image-side surface. The fourth lens 640 may have positive refractive power, and may have a concave object-side surface and a convex image-side surface. The fifth lens 650 may have negative refractive power, and may have a concave object-side surface and a around a paraxial region, and an image-side surface of the sixth lens may be concave at a paraxial region and may be convex around a paraxial region.

The third lens 630 may have the largest refractive index of all the lenses. For example, the third lens 630 may have a refractive index of 1.65 or greater, but the other lenses may have a refractive index of lower than 1.65.

The third lens 630 may have the smallest Abbe number of all the lenses. For example, the third lens 630 may have an Abbe number of lower than 20, and the other lenses may have an Abbe number of 20 or greater.

The optical imaging system 600 may include a stop ST. For example, the stop ST may be disposed between the first lens 610 and the second lens 620. The stop ST may adjust the amount of light incident to an imaging plane 680.

The optical imaging system 600 may include a filter 670. For example, the filter 670 may be disposed between the sixth lens 660 and the imaging plane 680. The filter 670 may block light of a certain wavelength from entering. For example, the filter 670 of the example embodiment may block infrared rays from being incident to the imaging plane 680.

The optical imaging system 600 may include an image sensor. The image sensor may provide the imaging plane 680 on which light refracted through the lenses is formed. The image sensor may convert an optical signal formed on the imaging plane 680 into an electrical signal.

Figure 11:
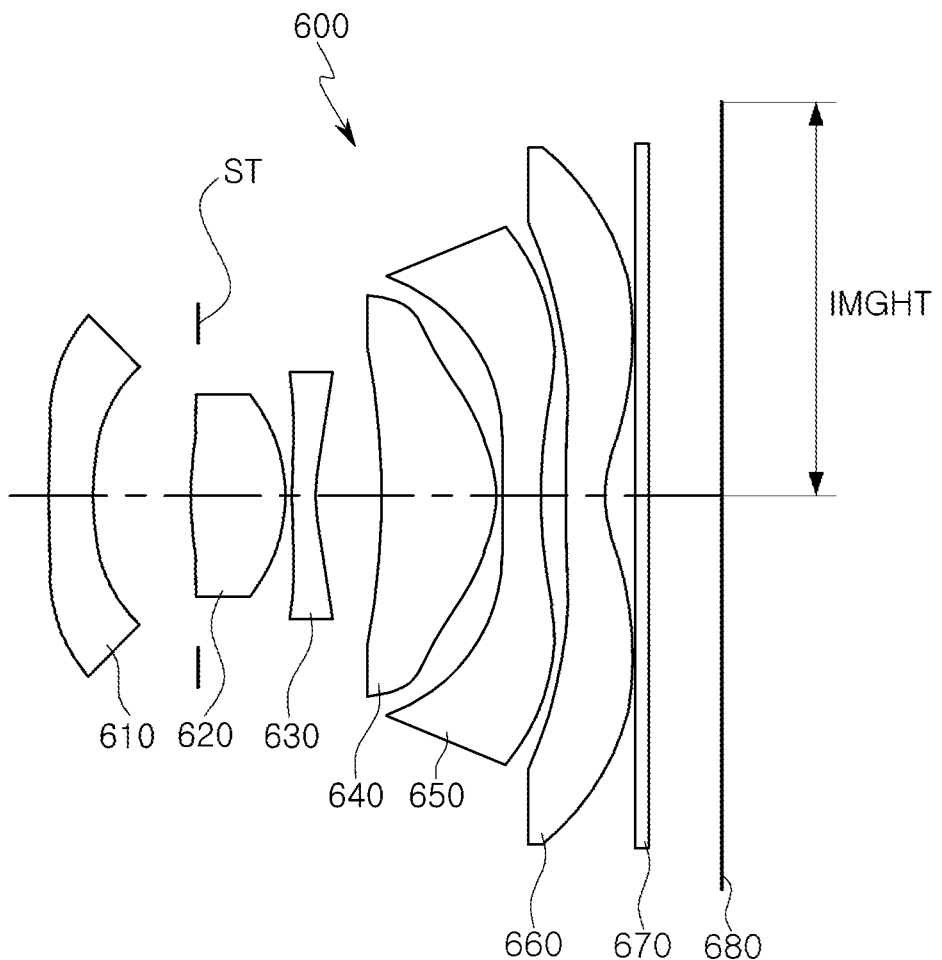
FIG. 11 is a diagram illustrating a sixth example of an optical imaging system
Figure 12:
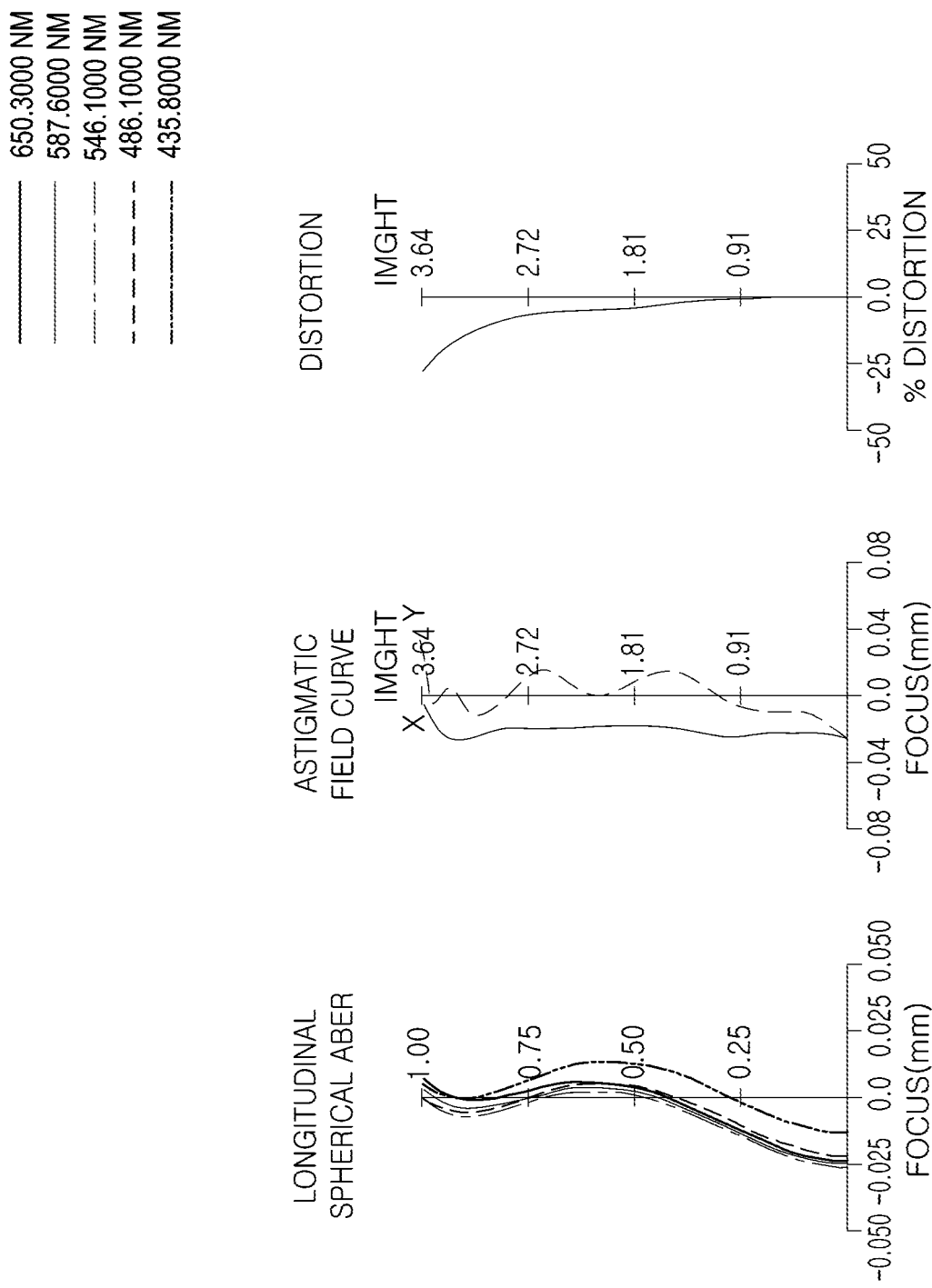
FIG. 12 is aberration curves of the optical imaging system illustrated in FIG. 11.

The optical imaging system 600 may exhibit aberration characteristics as illustrated in FIG. 11. Table 11 below shows lens characteristics of the optical imaging system 600, and Table 12 shows aspherical characteristics of the optical imaging system 600.

The optical imaging system 600 may have a distortion aberration of a considerable size at the highest height of the imaging plane. For example, the optical imaging system 600 may have a distortion aberration of approximately −35% at the highest height of the imaging plane.

TABLE 11

| Surface No. | Note | Radius of Curvature | Thickness/ Distance | Refractive Index | Abbe Number | Effective Radius | Focal Length |
|---|---|---|---|---|---|---|---|
| S1 | First | −5.6645 | 0.3625 | 1.5459 | 56.11 | 1.6200 | −7.4130 |
| S2 | Lens | 14.5459 | 0.9343 | | | 1.1394 | |
| S3 | Second | 4.3848 | 0.8820 | 1.5459 | 56.11 | 0.6500 | 2.2696 |
| S4 | Lens | −1.6066 | 0.0307 | | | 0.9315 | |
| S5 | Third | 4.3362 | 0.2351 | 1.6795 | 19.25 | 1.0436 | −6.6652 |
| S6 | Lens | 2.1666 | 0.6000 | | | 1.1690 | |
| S7 | Fourth | −10.7495 | 1.0885 | 1.5459 | 56.11 | 1.4195 | 2.2251 |
| S8 | Lens | −1.1315 | 0.0558 | | | 1.7065 | |
| S9 | Fifth | −21.4222 | 0.3500 | 1.6461 | 23.53 | 1.8572 | −21.5767 |
| S10 | Lens | 40.1732 | 0.2254 | | | 2.4077 | |
| S11 | Sixth | 12.5173 | 0.3500 | 1.5712 | 37.36 | 2.5272 | −2.2066 |
| S12 | Lens | 1.1334 | 0.3005 | | | 2.8831 | |
| S13 | Filter | infinity | 0.1100 | 1.5183 | 64.17 | 3.1989 | |
| S14 | | infinity | 0.6250 | | | 3.2383 | |
| S15 | Imaging Plane | infinity | 0.0250 | | | 3.6292 | |

TABLE 12

| Surface No. | R | K | A | B | C | D | E | F | G | H | J |
|---|---|---|---|---|---|---|---|---|---|---|---|
| S1 | −5.6645 | −6.817 | 0.197 | −0.122 | 0.072 | −0.020 | −0.009 | 0.012 | −0.005 | 0.001 | 0.000 |
| S2 | 14.5459 | −99.000 | 0.275 | −0.129 | 0.303 | −0.996 | 2.474 | −3.627 | 3.094 | −1.412 | 0.262 |
| S3 | 4.3848 | −13.513 | −0.007 | 0.063 | −0.905 | 3.915 | −11.140 | 22.579 | −42.015 | 62.423 | −43.822 |
| S4 | −1.6066 | −1.546 | −0.043 | 0.333 | −2.652 | 9.223 | −19.937 | 27.635 | −24.138 | 12.124 | −2.691 |
| S5 | 4.3362 | 1.843 | −0.201 | 0.644 | −2.584 | 6.676 | −11.394 | 12.720 | −8.924 | 3.567 | −0.619 |
| S6 | 2.1666 | −0.834 | −0.234 | 0.508 | −1.175 | 1.999 | −2.390 | 1.948 | −1.025 | 0.314 | −0.042 |
| S7 | −10.7495 | 54.243 | −0.038 | 0.057 | −0.007 | −0.067 | 0.106 | −0.080 | 0.034 | −0.007 | 0.001 |
| S8 | −1.1315 | −1.043 | 0.070 | 0.116 | −0.258 | 0.229 | −0.109 | 0.029 | −0.004 | 0.000 | 0.000 |
| S9 | −21.4222 | 62.653 | 0.007 | 0.221 | −0.448 | 0.398 | −0.218 | 0.079 | −0.018 | 0.002 | 0.000 |
| S10 | 40.1732 | 85.631 | 0.260 | −0.264 | 0.107 | −0.010 | −0.008 | 0.004 | −0.001 | 0.000 | 0.000 |
| S11 | 12.5173 | −75.714 | 0.199 | −0.487 | 0.422 | −0.197 | 0.056 | −0.010 | 0.001 | 0.000 | 0.000 |
| S12 | 1.1334 | −1.059 | −0.268 | 0.078 | −0.003 | −0.006 | 0.002 | 0.000 | 0.000 | 0.000 | 0.000 |

Tables 13 and 14 list optical properties values and values of conditional expressions of the optical imaging system of the first to sixth examples.

TABLE 13

| Note | First Example | Second Example | Third Example | Fourth Example | Fifth Example | Sixth Example |
|---|---|---|---|---|---|---|
| f number | 2.2000 | 2.2411 | 2.2269 | 2.4518 | 2.4025 | 2.4393 |
| TTL | 6.1760 | 6.1750 | 6.1750 | 6.1276 | 6.1900 | 6.1750 |
| SL | 5.1245 | 5.8118 | 5.1412 | 4.8288 | 4.9026 | 4.8780 |
| IMGHT | 3.6280 | 3.6280 | 3.6280 | 3.6280 | 3.6280 | 3.6280 |
| FOV | 128.40 | 128.40 | 128.45 | 120.56 | 127.48 | 123.39 |
| f | 2.677 | 2.677 | 2.677 | 2.800 | 2.680 | 2.690 |
| f1 | −4.647 | −4.661 | −4.753 | −9.316 | −7.786 | −7.413 |
| f2 | 2.136 | 2.161 | 2.171 | 2.367 | 2.347 | 2.270 |
| f3 | −6.655 | −6.709 | −6.706 | −6.965 | −6.811 | −6.665 |
| f4 | 3.417 | 3.270 | 3.497 | 2.358 | 2.892 | 2.225 |
| f5 | −1003.7 | −80.824 | 67.538 | 35.858 | 8.204 | −21.577 |
| f6 | −3.138 | −3.146 | −3.112 | −1.985 | −1.779 | −2.207 |

TABLE 14

| Conditional Expression | First Example | Second Example | Third Example | Fourth Example | Fifth Example | Sixth Example |
|---|---|---|---|---|---|---|
| DS1S3/2IMGHT | 0.144920 | 0.140660 | 0.142479 | 0.178985 | 0.177432 | 0.178728 |
| L1S1E/2IMGHT | 0.211001 | 0.203878 | 0.206726 | 0.220633 | 0.223264 | 0.223264 |
| TTL/2IMGHT | 0.851158 | 0.851020 | 0.851020 | 0.844481 | 0.853087 | 0.851020 |
| DL2/DL4 | 1.059518 | 1.127371 | 1.061361 | 0.985295 | 0.956423 | 0.810302 |
| TTL/f | 2.307060 | 2.306687 | 2.306687 | 2.188413 | 2.309701 | 2.295539 |
| SL/f | 1.914251 | 2.171022 | 1.920498 | 1.724586 | 1.829312 | 1.813383 |

According to the aforementioned examples, an optical imaging system having a field of view of 100 degrees or greater and an f number of 2.2 or lower may be provided.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens having negative refractive power, a second lens having positive refractive power, a third lens having negative refractive power, a fourth lens having positive refractive power and a concave object-side surface in a paraxial region thereof, a fifth lens having refractive power, and a sixth lens having negative refractive power, disposed in order from an object side,
wherein a radius of curvature of an image-side surface of the third lens is greater than a radius of curvature of an object-side surface of the fourth lens,
wherein a field of view is 120 degrees or greater, and
wherein a distortion aberration at a highest height of an imaging plane is +30% or greater or −30% or lower.

2. The optical imaging system of claim 1, wherein 0.1<DS1S3/2IMGHT<0.2, where DS1S3 is a distance from an object-side surface of the first lens to an object-side surface of the second lens, and 2IMGHT is a diagonal length of the imaging plane.

3. The optical imaging system of claim 1, wherein 0.2<L1S1E/2IMGHT<2.0, where L1S1E is an effective radius of an object-side surface of the first lens, and 2IMGHT is a diagonal length of the imaging plane.

4. The optical imaging system of claim 1, wherein an Abbe number of the third lens is lower than 20.

5. The optical imaging system of claim 1, wherein TTL/2IMGHT<0.9, where TTL is a distance from an object-side surface of the first lens to the imaging plane, and 2IMGHT is a diagonal length of the imaging plane.

6. The optical imaging system of claim 1, wherein an f number is 2.2 or lower.

7. The optical imaging system of claim 1, wherein 0.8<DL2/DL4<1.2, where DL2 is a thickness of the second lens at a center of an optical axis, and DL4 is a thickness of the fourth lens at a center of an optical axis.

8. The optical imaging system of claim 1, wherein an effective radius of an object-side surface of the third lens is greater than an effective radius of an object-side surface of the second lens.

9. An optical imaging system, comprising:
a first lens having negative refractive power and having a concave object-side surface, a second lens having positive refractive power, a third lens having negative refractive power and having a convex object-side surface, a fourth lens having positive refractive power and a concave object-side surface, a fifth lens having refractive power, and a sixth lens having negative refractive power, disposed in order from an object side,
wherein a radius of curvature of an image-side surface of the third lens is greater than a radius of curvature of an object-side surface of the fourth lens, and
wherein a field of view is 120 degrees or greater.

10. The optical imaging system of claim 9, wherein the second lens has a convex object-side surface.

11. The optical imaging system of claim 9, wherein one of an object-side surface and an image-side surface of the fifth lens is concave.

12. The optical imaging system of claim 9, wherein the sixth lens has a concave image-side surface.

13. The optical imaging system of claim 9, wherein 0.1<DS1S3/2IMGHT<0.2, where DS1S3 is a distance from an object-side surface of the first lens to an object-side surface of the second lens, and 2IMGHT is a diagonal length of an imaging plane.

14. The optical imaging system of claim 9, wherein a distortion aberration at a highest height of an imaging plane is +30% or greater or −30% or lower.

15. The optical imaging system of claim 9, wherein the second lens has a convex image-side surface.

16. The optical imaging system of claim 9, wherein the third lens has a concave image-side surface.

17. The optical imaging system of claim 9, wherein the first lens has a concave image-side surface.

* * * * *